United States Patent [19]

Bawks et al.

[11] Patent Number: 5,221,238
[45] Date of Patent: Jun. 22, 1993

[54] DIFFERENTIAL WITH PRELOAD MEANS AND SECTIONAL SPACER MEANS

[75] Inventors: James R. Bawks, Mt. Clemens; Walter L. Dissett, Farmington Hills, both of Mich.

[73] Assignee: Dyneet Corporation, Scottsdale, Ariz.

[21] Appl. No.: 933,095

[22] Filed: Aug. 21, 1992

[51] Int. Cl.[5] ............................... F16H 1/38
[52] U.S. Cl. ................................. 475/226; 475/252
[58] Field of Search .................. 475/226, 249, 252

[56] References Cited

U.S. PATENT DOCUMENTS

| 3,706,239 | 12/1972 | Myers | 475/226 |
| 4,365,524 | 12/1982 | Dissett et al. | 475/226 |
| 4,625,585 | 12/1986 | Dissett | 475/226 |
| 4,677,876 | 7/1987 | Dissett | 475/226 |
| 4,751,853 | 6/1988 | Dissett | 475/226 |
| 5,122,102 | 6/1992 | Chludek et al. | 475/249 X |

FOREIGN PATENT DOCUMENTS 130806 6/1987 European Pat. Off. .

Primary Examiner—Dirk Wright
Attorney, Agent, or Firm—Laubscher & Laubscher

[57] ABSTRACT

A differential of the helical gear type is disclosed for vehicles including an improved sectional spacer device having a generally C-shaped outer spacer section for maintaining the side gears in axially spaced relation, and a removable inner core spacer section for maintaining the axle shafts in axially spaced relation and for supporting the leg portions of the outer section against displacement toward each other. Spring devices are non-rotatably mounted in the housing for biasing the side gears axially inwardly toward the outer spacer section, thereby to reduce the clearances between the side gears and the outer spacer section, respectively, whereby differential backlash is reduced.

11 Claims, 3 Drawing Sheets

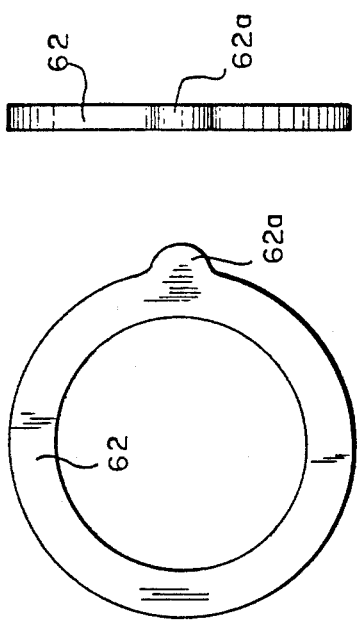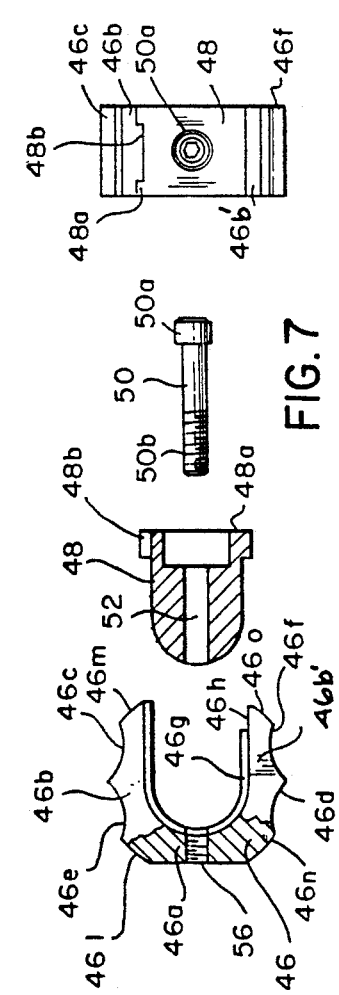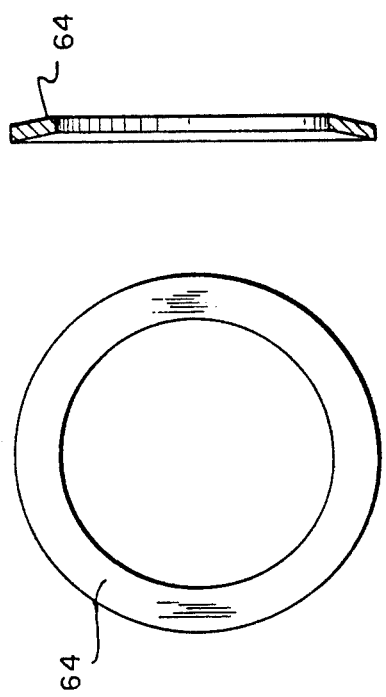

DIFFERENTIAL WITH PRELOAD MEANS AND SECTIONAL SPACER MEANS

STATEMENT OF THE INVENTION

A differential of the helical gear type is provided with improved sectional spacer means having a C-shaped outer section for maintaining the side gears in axially spaced relation, and an inner core section for maintaining the axle shafts in axially spaced relation, and for supporting the leg portions of the outer sections against displacement toward each other. Spring means bias the side gears axially inwardly toward the spacer means, thereby to reduce the clearances between the side gears and the spacer means so that differential backlash is reduced.

BRIEF DESCRIPTION OF THE PRIOR ART

Differentials of the helical gear type for use in automotive vehicles are well known in the patented prior art, as evidenced, for example, by the patents to Myers U.S. Pat. No. 3,706,239, Dissett et al U.S. Pat. No. 4,365,524, and Dissett U.S. Pat. Nos. 4,625,585, 4,677,876 and 4,751,853, each assigned to the same assignee as the present invention.

In the published European patent application No. 130,806 a differential mechanism of the helical gear type is disclosed having Belleville type disc springs centrally arranged between a pair of thrust pads for biasing the same axially apart into engagement with the adjacent ends of the associated sun gears, respectively, thereby to urge the sun gears against respective thrust plates provided at the ends of the casing.

One problem normally present in such known differentials is that of inherent differential backlash. More particularly, when the vehicle experiences a so-called "ice line" condition with one wheel on a low coefficient of friction surface and another on a high coefficient surface, one wheel "spins out" relative to another. When this occurs, the driver must apply the brakes until the one wheel spin out stops. It is known that it takes approximately 50 lb - ft. torque resistance on each wheel to resist being driven before the helical pinion differential will begin to bias torque-on its own, and if this were to be designed into a differential preload device without getting excessive backlash, the performance of the differential would be greatly enhanced.

Another problem that occurs with helical pinion differentials is that of assembling the differential components in such a manner that access is provided to the adjacent ends of the spaced axle shafts to permit the mounting thereon of the C-shaped locking devices that prevent axial separation of the shafts relative to the side gears. One solution proposed in the aforementioned Dissett et al U.S. Pat. No. 4,365,524 is the use of wedge block thrust bearing means to maintain the axle shafts in axially spaced relation. Although these spacer means have proved to function satisfactorily, they are of relatively complex construction and are rather expensive to manufacture.

The present invention was developed to avoid the above and other drawbacks of the known types of helical gear differentials.

SUMMARY

Accordingly, a primary object of the present invention is to provide an improved differential of the helical gear type including preload spring means for biasing the side gears axially inwardly toward the spacer means, thereby to soften differential backlash and to reduce differential noise. To this end, annular compression spring packages are non-rotatably mounted in counterbores, contained on the differential housing adjacent the remote ends of the side gears, respectively. Each spring package includes a plurality of spring disks contained between a tab washer adjacent the associated side gear. In order to prevent rotation of the spring package and thereby avoid undue wear of the spring disks the tab washer includes a radially extending tab portion that extends within a corresponding recess formed in the counterbore side wall.

According to another object of the invention, the differential includes improved spacer means for maintaining the side gears and axle shafts in axially spaced relation, respectively, said spacer means being sectional to afford access to the ends of the axle shafts to permit the mounting thereon of the C-shaped locking members that prevent axial separation of the axle shafts relative to the associated side gears. More particularly, the spacer means includes an outer generally C-shaped spacer member arranged colinearly between the side gears, and a core section removably mounted between the leg portions of the outer spacer member. Access to the spacer means and the adjacent ends of the axle shafts is afforded via a lateral opening contained in the wall portion of the differential housing. The spacer sections are connected together by a screw or bolt having an enlarged head portion adjacent the housing opening, a shank portion that extends through a throughbore contained in the core member, and a threaded extremity that is threadably connected with a corresponding bore contained in the transverse portion of the outer section. The outer surfaces of the leg portions of the outer spacer member are scalloped to define pairs of grooves for supporting the enmeshing ends of the helical pinion gears, respectively. Thus, the outer spacer member provides full support for the pinion gears and permits them to remain in their normal position while under torque. The outer component is permanently assembled in the differential during the assembly of the side gears, and serves to prevent axial displacement of the side gears toward each other. Preferably, the outer and core spacer members are formed of powdered metal. The inner core member, which is installed after the C-shaped locking devices have been mounted on the adjacent axle shaft ends, serves to space the axle shafts against axial displacement toward each other, to support the leg portions of the outer spacer member when the loaded helical pinion gears tend to displace them toward each other, and to support the thrust forces from the side gear. Four surfaces on the outer periphery of the outer spacer member on opposite sides of the pinion-supporting grooves, respectively, improve the piloting of the outer spacer member in the housing.

BRIEF DESCRIPTION OF THE DRAWINGS

Other objects and advantages of the invention will become apparent from a study of the following specification when viewed in the light of the accompanying drawings, in which:

FIGS. 5-7 define an exploded view of the novel spacer means of FIGS. 1 and 3;

FIG. 8 is an end view of the assembled spacer means of FIG. 3;

FIGS. 9 and 10 are end and side views, respectively, of one of the tab washers of FIG. 1; and FIGS. 11 and 12 are end and side views, respectively, of one of the spring disk elements of FIG. 1.

DETAILED DESCRIPTION

Figure 1:
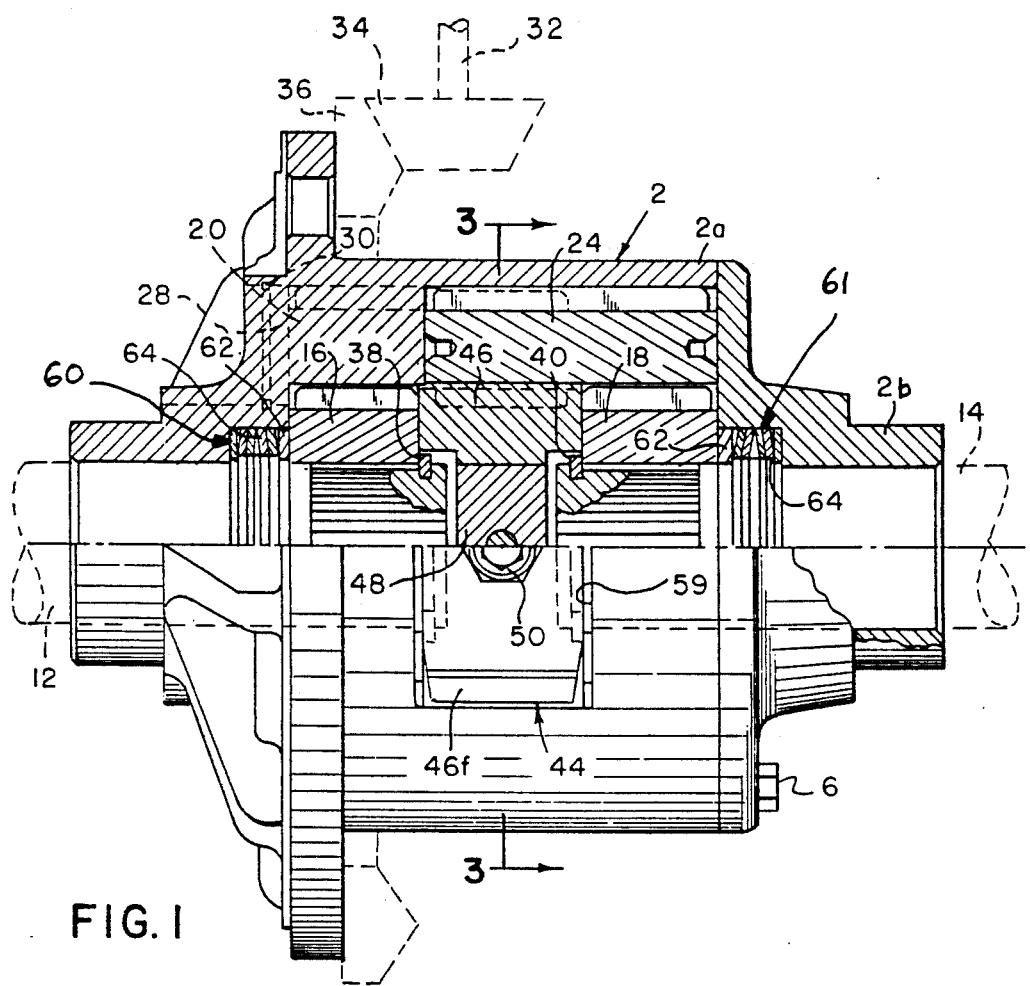
FIG. 1 is a partly sectioned elevational view of the improved differential of the present invention.
Figure 2:
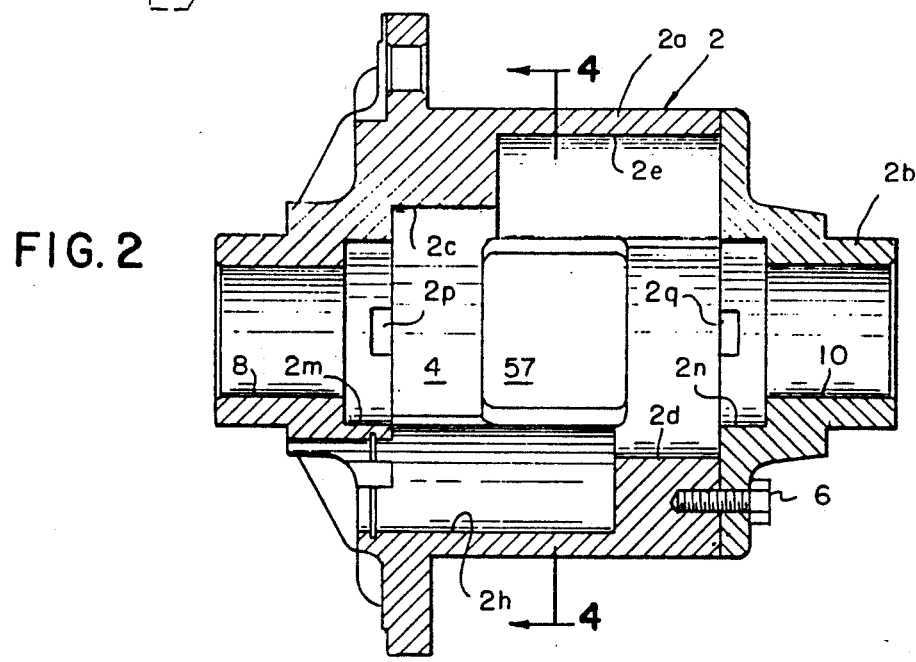
FIG. 2 is a longitudinal sectional view of the housing of FIG. 1.
Figure 4:
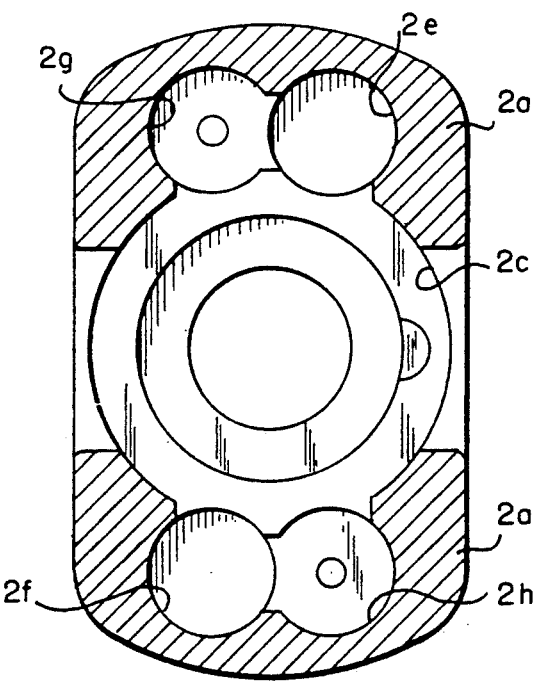
FIG. 4 is a sectional view taken along line 4—4 of FIG. 2.

Referring first more particularly to FIGS. 1 and 2, the differential of the present invention includes a housing 2 having a body section 2a containing a central chamber 4, and an end section 2b bolted to the end of the body section 2a by bolt means 6, thereby to close the chamber. At each end, the housing includes axially aligned openings 8 and 10 for receiving the axle shafts 12 and 14, respectively. Rotatably mounted in first counter bores 2c and 2d are a pair of side gears 16 and 18, respectively. As described in greater detail in the prior Dissett et al U.S. Pat. No. 4,365,524, the side gears 16 and 18 are internally splined for non-rotatable connection with the axle shafts 12 and 14, respectively. The side gears 16 and 18 are provided with external helical teeth in enmeshing engagement with the helical pinions 20 and 22, and 24 and 26, respectively. These pinions are journalled in corresponding counterbores 2e, 2f, 2g, 2h, contained in the housing body section 2a, as shown in FIG. 4. The axially displaced pinions of each pair are in enmeshing engagement at their overlapping ends, as is known in the art. The pinions are maintained in their bores by retaining plates 28 that are retained in place by C-shaped spring clips 30. The housing 2 is rotatably driven from the drive shaft 32 by pinion 34 and ring gear 36, as is known in the art.

Figure 3:
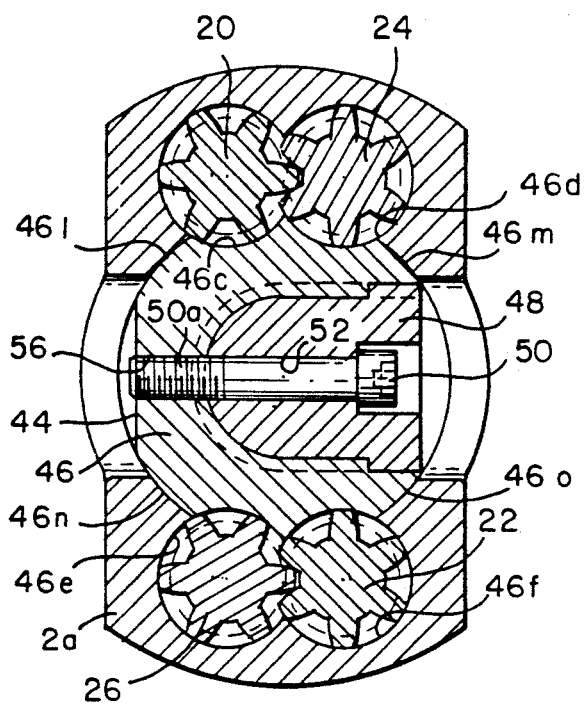
FIG. 3 is a sectional view taken along line 3—3 of FIG. 1.

The axle shafts 12 and 14 are prevented from axial outward displacement relative to the side gears 16 and 18 by resilient C-shaped retainers 38 and 40, respectively. In accordance with an important feature of the present invention, improved spacer means 44 are provided for maintaining the side gears 16 and 18 and the axle shafts 12 and 14 in axially spaced relation, respectively Referring to FIGS. 3 and 5-8, the spacer means include an outer C-shaped section 46, a core section 48, and a fastening screw 50. The fastening screw 50 has an enlarged head portion 50a at one end thereof, and a shaft portion that extends through a longitudinal throughbore 52 contained in core member 48, said screw shaft terminating in a threaded extremity 50b that is threadably mounted within a corresponding threaded bore 56 contained in the transverse portion 46a of the outer spacer section 46. The outer spacer section 46 includes a pair of parallel leg portions 46a and 46b that contain on their outer surfaces pairs of grooves 46c, 46d, and 46e, 46f, for rotatably supporting the enmeshing adjacent ends of the pinions 24 and 20 and of the pinions 22 and 26. On its inner circumference, the outer spacer member 46 includes a continuous central rib portion 46g that extends along the top leg 46b, across the transverse portion 46a, and along the bottom leg portion 46a. The outer configuration of the core member 48 corresponds generally with the inner configuration of the outer spacer member 46. The core member 48 includes an enlarged end portion 48a that is adapted to support the free extremities of the leg portions 46a and 46b, thereby to prevent the leg portions from displacement toward each other. To this end, the enlarged head portion 48a contains a groove 48b for receiving the corresponding portion of the rib 46g. It is to be noted that the rib 46g terminates short of the extremity of the lower leg 46a, so that the enlarged head portion 48a of the core member 48 is seated directly upon the surface 46h of the leg portion 46a. Thus, it is assured that the core member 48 can be assembled in only one way. Furthermore, in accordance with another important feature of the invention, the corner surfaces 46l, 46m, 46n, and 46o, support the corresponding surfaces of the body section 2a as shown in FIG. 3. The outer spacer section 46a and the core spacer section 48 are each formed of a suitable powdered metal material, for example, a steel/copper powdered metal mixture such as MPIF-Standard No. 35FX-1008-110HT. The housing includes opposed lateral access openings 57, 59 affording access to the screw 50 of the spacer means, and to the C-shaped shaft retainers 38 and 40.

According to another important feature of the invention, annular spring means 60, 61 are provided adjacent each end of the housing for biasing the side gears 16 and 18 and the axle shafts 12 and 14 axially inwardly toward engagement with the outer and core spacer members 46 and 48, respectively, thereby to reduce differential backlash. The spring means are mounted in housing counterbores 2m and 2n concentric with the axle shaft bores 8 and 10, as shown in FIG. 2. Each of the spring means includes a tab washer 62 in engagement with the adjacent end of the associated side gear, and a plurality of spring disks 64. In accordance with a characterizing feature, the tab washers include radially outwardly projecting tab portions 62a that extend within corresponding recesses 2p and 2q contained in the walls of counterbores 2m and 2n, respectively, thereby to prevent rotation of the spring means relative to the housing, whereby wear of the disk springs, thrust washer and housing is avoided.

OPERATION

To assemble the apparatus as shown in FIG. 1 with the cover section 2b removed, pinions 20 and 22 are introduced into their respective bores, and the retaining plates 28 are held in place by the C-shaped spring clips 30. Disk springs 64 are inserted into counterbore 2m, together with tab washer 62 the tab portion 62a of which extends within housing groove 2p. Side gear 16 is inserted into counterbore 2c, and the outer spacer member 46 is mounted in the counterbore shown in FIG. 3 with the surfaces 46l, 46m, 46n and 46o in supporting engagement with the corresponding housing surfaces, the spacer member 46 being seated against side gear 16. Side gear 18 is inserted in counterbore 2d, and pinions 24, 26 are inserted in their respective counterbores. Tab washer 62 and disk springs 64 are inserted in counterbore 2n contained in cover section 2b with tab portion 62a extending into groove 2g, and the cover section 2b is bolted in place by bolts 6, thereby compressing the disk springs 64 and 62 to bias the side gears 16 and 18 axially inwardly toward the outer spacer member 46.

After the axle shafts 12 and 14 are connected in splined relation with the side gears 16 and 18, respectively, the C-retainers are inserted within the corresponding shaft grooves to prevent axial outward displacement of the axle shafts. Core member 48 is then inserted, via lateral housing openings 59, between the legs of the C-shaped outer spacer member and is fastened in place by screw 50. Owing to the biasing action of spring means 62 and 64, the normal clearance between the side gears and the spacer means is eliminated, thereby to reduce differential backlash. Furthermore, owing to the provision of the C-shaped locking means, the axle shafts are similarly axially biased inwardly toward the spacer core section 48.

The operation of the helical gear differential per se is known in the art, as evidenced by the aforementioned Dissett et al U.S. Pat. No. 4,365,524, and will not be repeated here. It suffices to say that rotation of drive shaft 32 causes rotation of housing 2 to normally drive axle shafts 12 and 14 at the same speed via the helical pinion gears and the side gears. When one side gear applies more resistance to the torque driving the pinion, its mating pinions tend to separate from the side gear and wedge into the counterbore pockets. As the input torque increases, the wedging of the pinions in the housing also increases. As the coefficient of friction under each of the drive wheels varies, the amount of torque distributed to each wheel is automatically proportioned so that wheel slip under the tire with the poorest traction will be controlled.

While the preferred forms and embodiments of the invention have been illustrated and described, various changes may be made without deviating from the inventive concepts set forth above.

What is claimed is:

1. A helical gear type differential apparatus for supplying driving torque from a drive shaft to a pair of aligned output shafts, comprising:
   (a) a differential carrier housing adapted to be rotatably driven by the drive shaft, said housing including a body section containing a chamber, and at least one end section removably connected with said body section to close said chamber, said housing containing at opposite ends aligned axle shaft openings;
   (b) a pair of annular helical side gears journalled in corresponding aligned first counterbores contained in opposite ends of said housing, respectively, said side gears having splined inner circumferences for non-rotatable connection with the output shafts when the adjacent ends of the shafts extend in axially spaced relation through said housing axle shaft openings, respectively;
   (c) lock means preventing axial outward displacement of the output shafts relative to said side gears, respectively;
   (d) a plurality of pairs of differential helical pinions having threads of opposite hands, respectively, the pinions of each pair being mounted with an outside diameter running fit within bores contained in opposite ends of said housing, respectively, the adjacent ends of said bores being in communication and the adjacent ends of said differential helical pinions being in overlapping enmeshing engagement with each other, said pinions having longitudinal axes parallel with the axes of, and being in enmeshing engagement with, said side gears, respectively, whereby the torque transmitted through said differential mechanism introduces gear tooth loads on said pinions which cause a frictional torque resistance as said pinions rotate within their respective pinion cavities, thereby introducing a torque bias in the differential mechanism; and
   (e) spacer means arranged between said side gears for maintaining said side gears and said output shafts in axially spaced relation, respectively, said spacer means being sectional and including:
      (1) a generally C-shaped outer section arranged coaxially between said side gears, said outer section including a pair of generally parallel leg portions joined at one end by a transverse portion, the outer surface of each of said leg portions containing a pair of parallel grooves for rotatably supporting the adjacent ends of the corresponding pinions, respectively; and
      (2) a core section removably mounted contiguously between said leg portions, thereby to support said leg portions against movement toward each other, said core section being arranged to maintain said shafts in axially spaced relation.

2. Apparatus as defined in claim 1, wherein said housing contains a lateral opening affording access to said spacer means; and further wherein said spacer means includes:
   (3) screw means connecting said core section with said outer section, said screw means comprising a fastening screw having a head portion adjacent said housing opening, and a shank portion that extends through a throughbore contained in said core section and terminates in a threaded portion threadably mounted in a corresponding threaded bore contained in said transverse portion.

3. Apparatus as defined in claim 2, wherein the adjacent inner surfaces of said outer spacer leg portions are parallel, and further wherein the circumferential surface of said core portion corresponds with and is in contiguous circumferential engagement with the corresponding inner surface of said outer member.

4. Apparatus as defined in claim 3, wherein the outer surface of each leg of said outer spacer section includes a pair of circumferential surfaces on opposite sides of said grooves in supporting engagement with corresponding surfaces of said housing body portion, respectively.

5. Apparatus as defined in claim 4, wherein said outer spacer section is provided on its inner circumferential surface with a central rib that extends continuously along one leg portion, across said transverse portion, and along the other leg portion; and further wherein said core section includes an enlarged end portion that extends in supporting relation between the free extremities of said leg portions, said enlarged end portion containing a groove that receives said rib, thereby to properly orient said core section relative to said outer spacer section.

6. Apparatus as defined in claim 5, wherein each of said outer and core spacer sections is formed of powdered metal.

7. Apparatus as defined in claim 1, and further including spring means biasing each of said side gears axially inwardly toward said outer spacer section, respectively, thereby to reduce differential backlash.

8. Apparatus as defined in claim 7, wherein said housing contains counterbores adjacent the remote ends of said side gears, respectively, said spring means being annular and being arranged in said counterbores, respectively.

9. Apparatus as defined in claim 8, wherein each of said spring means includes a plurality of coaxially arranged annular disk springs, and an annular tab washer arranged colinearly between said disk springs and the associated side gear, said tab washer including a radially outwardly directed tab portion that extends within a corresponding recess contained in said housing, thereby to prevent rotation of said spring means relative to said housing.

10. Apparatus as defined in claim 9, wherein each of said spring means further includes an annular thrust washer arranged colinearly between said disk springs and the bottom wall of the associated counterbore.

11. A helical gear type differential apparatus for supplying driving torque from a drive shaft to a pair of aligned output shafts, comprising:

(a) a differential carrier housing adapted to be rotatably driven by the drive shaft, said housing including a body section containing a chamber, and at least one end section removably connected with said body section to close said chamber, said housing containing at opposite ends aligned axle shaft openings;

(b) a pair of annular helical side gears journalled in corresponding aligned first counterbores contained in opposite ends of said housing, respectively, said side gears having splined inner circumferences for non-rotatable connection with the output shafts when the adjacent ends of the shafts extend in axially spaced relation through axle shaft openings, respectively;

(c) lock means preventing axial outward displacement of the output shafts relative to said side gears, respectively;

(d) a plurality of pairs of differential helical pinions having threads of opposite hands, respectively, the pinions of each pair being mounted with an outside diameter running fit within bores contained in opposite ends of said housing, respectively, the adjacent ends of said bores being in communication and the adjacent ends of said differential helical pinions being in overlapping enmeshing engagement with each other, said pinions having longitudinal axes parallel with the axes of, and being in enmeshing engagement with, said side gears, respectively, whereby the torque transmitted through said differential mechanism introduces gear tooth loads on said pinions which cause a frictional torque resistance as said pinions rotate within their respective pinion cavities, thereby introducing a torque bias in the differential mechanism;

(e) spacer means arranged between said side gears for maintaining said side gears and said output shafts in axially spaced relation, respectively; and (f) preload spring means biasing said side gears axially inwardly toward said spacer means, respectively, thereby to reduce differential backlash, said spring means being annular and being arranged in counterbores contained in said housing adjacent the remote ends of said side gears, respectively, each of said spring means including:

(1) a plurality of coaxially arranged annular disk springs; and (2) an annular tab washer arranged colinearly between said disk springs and the associated side gear, said tab washer including a radially outwardly directed tab that extends within a corresponding recess contained in said housing, thereby to prevent rotation of said spring means relative to said housing.

* * * * *